(12) United States Patent
Shao et al.

(10) Patent No.: US 11,143,907 B2
(45) Date of Patent: Oct. 12, 2021

(54) METHOD AND SYSTEM FOR DISPLAYING 3D IMAGES

(71) Applicant: Firefly Dimension Inc., San Jose, CA (US)

(72) Inventors: Peng Shao, San Jose, CA (US); Ke Xu, Santa Clara, CA (US)

(73) Assignee: Firefly Dimension Inc., San Jose, CA (US)

( * ) Notice: Subject to any disclaimer, the term of this patent is extended or adjusted under 35 U.S.C. 154(b) by 172 days.

(21) Appl. No.: 16/031,861

(22) Filed: Jul. 10, 2018

(65) Prior Publication Data

US 2019/0011776 A1 Jan. 10, 2019

Related U.S. Application Data

(60) Provisional application No. 62/530,716, filed on Jul. 10, 2017.

(51) Int. Cl.
*G02F 1/1335* (2006.01)
*G02B 5/32* (2006.01)
(Continued)

(52) U.S. Cl.
CPC ......... *G02F 1/133555* (2013.01); *G02B 5/32* (2013.01); *G02B 27/0172* (2013.01);
(Continued)

(58) Field of Classification Search
CPC . G02F 1/133555; G02B 27/0172; G02B 5/32; G02B 27/0944; G02B 2027/0174;
(Continued)

(56) References Cited

U.S. PATENT DOCUMENTS 8,934,159 B2 1/2015 Shikii et al.
2015/0260992 A1* 9/2015 Luttmann .......... G02B 27/0172
359/631

(Continued)

FOREIGN PATENT DOCUMENTS

EP 0588617 B1 4/2001

OTHER PUBLICATIONS

PCT International Search Report and the Written Opinion dated Sep. 25, 2018, issued in corresponding International Application No. PCT/US2018/041501 (7 pages).

*Primary Examiner* — Jade R Chwasz (57) ABSTRACT

A display system for presenting a holographic image to a viewer may comprise a coherent light source, a display element, and a computing device operatively connected to the coherent light source and the display element, the coherent light source emitting a light that enters the display element from the same side of the viewer, and the display element comprising a liquid crystal layer and a partially-transmissive-partially-reflective layer, wherein the computing device is configured to provide a control signal to the display element to present the holographic image, wherein the liquid crystal layer receives light from the light source and is controlled by the control signal to modulate a phase of the light from the light source, and wherein the partially-transmissive-partially-reflective layer receives light from the liquid crystal layer and reflects the light back through the liquid crystal layer to the viewer.

19 Claims, 9 Drawing Sheets

(51) Int. Cl.
*G02B 27/09* (2006.01)
*G03H 1/22* (2006.01)
*G02B 27/01* (2006.01)

(52) U.S. Cl.
CPC ....... *G02B 27/0944* (2013.01); *G03H 1/2286* (2013.01); *G03H 1/2294* (2013.01); *G02B 2027/0174* (2013.01); *G03H 2001/2284* (2013.01); *G03H 2210/30* (2013.01); *G03H 2223/16* (2013.01); *G03H 2225/32* (2013.01); *G03H 2225/52* (2013.01)

(58) Field of Classification Search
CPC .. G02B 27/283; G02B 27/0103; G02B 27/10; G02B 27/144; G03H 1/2294; G03H 1/0005; G03H 2001/0224; G03H 1/2286; G03H 2001/2284; G03H 2223/16; G03H 2210/30; G03H 2225/52; G03H 2225/32
USPC .......................................................... 359/34
See application file for complete search history.

(56) References Cited

U.S. PATENT DOCUMENTS

| | | |
|---|---|---|
| 2015/0378080 A1 | 12/2015 | Georgiou et al. |
| 2016/0327906 A1* | 11/2016 | Futterer ................. G03H 1/02 |
| 2017/0131546 A1* | 5/2017 | Woltman ............ G02B 5/1866 |
| 2017/0299869 A1* | 10/2017 | Urey ..................... G02B 27/48 |

* cited by examiner

METHOD AND SYSTEM FOR DISPLAYING 3D IMAGES

CROSS REFERENCE TO RELATED APPLICATION

This application claims the benefit of priority to U.S. Provisional Application No. 62/530,716, filed with the U.S. Patent and Trademark Office on Jul. 10, 2017, and entitled "METHOD AND SYSTEM FOR DISPLAYING 3D IMAGES," which is hereby incorporated by reference in its entirety.

TECHNICAL FIELD

The present disclosure relates generally to three dimensional (3D) image display technology, and in particular, to a system and method for hologram display.

BACKGROUND

Virtual reality (VR), augmented reality (AR), and mixed reality technologies have brought users into a new realm of content consumption. These technologies also provide users a new way of perceiving and interacting with computers and other users. However, existing display technologies have several drawbacks that have prevented users from fully enjoying VR and AR technologies for long. For example, the existing technologies may be lack of variant depths. Current AR or VR technologies use stereoscopics to create an illusion of depth. For example, existing technologies present two offset images to the left and right eyes of the viewer respectively. These images may be then combined in a human vision system to provide the viewer a perception in a three dimensional (3D) perspective. However, a problem may arise as the perceived 3D scene comes from two images both at a fixed distance. While the brain of the viewer treats the scene as a group of elements at different depths resulting in different eye vergences, the accommodation of eyes are fixed to the depth where the stereoscopic images are actually displayed. Such a conflict usually leads to eye strain, motion sickness, and other discomforts during heavy use of such an AR or VR system.

One solution employs an eye tracking system and a variable focal length optical system to change the depth of displayed images based on the place at which the viewer looks. Another solution uses an optical system that presents a finite number of image layers corresponding to different depths of the displayed content. However, neither of the solutions can completely solve the problem. The effectiveness of former solution largely depends on the accuracy of the eye tracking system and the response rate of the optical system. In addition, such a solution can only present a single depth at a time, which means that a 3D scene is still displayed at the same depth. The later solution may simultaneously display a 3D scene at multiple discrete depths, but the quality of the display is likely to be affected by the density of the image layers. Further, the range of available depths is usually limited in the later solution.

SUMMARY

According to one aspect of the present disclosure, a display system for presenting a holographic image to a viewer may comprise: a coherent light source, a display element, and a computing device operatively connected to the coherent light source and the display element, the coherent light source emitting a light that enters the display element from the same side of the viewer, and the display element comprising a liquid crystal layer and a partially-transmissive-partially-reflective layer, wherein the computing device is configured to provide a control signal to the display element to present the holographic image, wherein the liquid crystal layer receives light from the coherent light source and is controlled by the control signal to modulate a phase of the light from the coherent light source, and wherein the partially-transmissive-partially-reflective layer receives light from the liquid crystal layer and reflects the light back through the liquid crystal layer to the viewer.

In some embodiments, the partially-transmissive-partially-reflective layer is fully reflective, blocking a light from a real world to pass through. In some embodiments, the liquid crystal layer is made of one of the following types of liquid crystals: Twisted Nematic (TN), Vertically Aligned Nematic (VAN), Parallel Aligned Nematic (PAN), zero-twisted Electronically Controlled Birefringence (ECB), Optically Controlled Birefringence (OCB), Surface-stabilized Ferroelectric Liquid Crystal (SSFLC).

In some embodiments, the display element may further comprise a first electrode layer disposed on one surface of the liquid crystal layer, and a second electrode layer disposed on a surface of the partially-transmissive-partially-reflective layer, and wherein the partially-transmissive-partially-reflective layer is placed between the liquid crystal layer and the second electrode layer. In some embodiments, the first and second electrode layers may include a common electrode layer and a pixel electrode layer, wherein the first electrode layer and the second electrode layer are transmissive. In some embodiments, the display element may further comprise a retarder layer configured to modify polarization of an incoming and outcoming light. In some embodiments, the common electrode layer may be made of Indium Tin Oxide (ITO). In some embodiments, the pixel electrode layer may be made of ITO.

In some embodiments, the phase of the light may be modulated by the liquid crystal to change by a continuous value. In some embodiments, the display system may further comprise a guiding element for directing a light from the coherent light source to the display element and adjusting an incidence angle of the light from the coherent light source. In some embodiments, the guiding element may be a substrate placed between the coherent light source and the display element.

In some embodiments, the substrate may comprise a beam splitter. In some embodiments, the beam splitter may be a linear polarizing beam splitter. In some embodiments, the substrate may comprise a curved reflecting surface in a prism form. The curved reflecting surface may further comprise a polarized coating. In some embodiments, the substrate may further comprise a retarder. The retarder may be configured to modify polarization of an incoming and outcoming light. In some embodiments, the substrate may be a lightguide element configured to reflect the light from the coherent light source to enter the display element. In some embodiments, the substrate may comprise a diffractive optical element (DOE) configured to modify an incidence angle of the light from the coherent light source to a predetermined range of values.

In some embodiments, the display system may further comprise a transmissive spatial light modulator (SLM) configured to modulate an amplitude of the light reflected back through the liquid crystal layer to the viewer.

In some embodiments, the display element may further comprise an electrode layer disposed on a surface of the partially-transmissive-partially-reflective layer, wherein partially-transmissive-partially-reflective layer may be placed between the liquid crystal layer and the electrode layer, and wherein, for each cell in the liquid crystal layer, the electrode layer may comprise two electrodes that generate an electric field across the cell in the liquid crystal layer.

According to another aspect of the present disclosure, a display element for presenting a holographic image to a viewer may comprise: a liquid crystal layer and a partially-transmissive-partially-reflective layer, wherein the liquid crystal layer may receive light from a coherent light source, and wherein the light may be from the same side of the viewer relative to the display element, and wherein the liquid crystal layer may be controlled by a control signal to modulate a phase of the light from the coherent light source, and wherein the partially-transmissive-partially-reflective may layer receive light from the liquid crystal layer and reflect the light back through the liquid crystal layer to the viewer.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION OF THE EMBODIMENTS

The present disclosure provides a novel method and system that use Computer Generated Holography (CGH) with a specially designed transmissive display element or panel to present a 3D scene with true and continuous depths. An underlying principle of a holographic display panel is a variation of the well-known principle of Fresnel holography. In a Fresnel holographic system, a spatial light modulator modifies the phase and amplitude of the light encountering the hologram plane. The incoming light is diffracted so that it focuses on one or multiple object points to form a holographic image.

A proposed holographic display panel may include a liquid crystal layer. The holographic display panel may behave as a spatial light modulator. The cells of the liquid crystal layer may be capable of altering the phase of the light passing through. Such a phase alteration may deflect light, and the spatial frequency of such phase alternation may dominate the maximum angle of deflection. In some embodiments, the spatial frequency may depend on the pitch size of the cells of the liquid crystal layer. When applied with a proper control voltage, the cells inside the liquid crystal layer may form different alignments that alter the phase of incident light differently so that the light focuses on one or more object points and a desired holographic image may be generated.

According to some embodiments of the present disclosure, a novel system that uses a specially designed transmissive display element or a specially designed partially-transmissive display element to generate a holographic image is provided. The technique may be deployed on a head mounted device wearable by a viewer. The generated holographic image may be directly presented in front of the viewer's eyes without interfering the viewer's observation of the real world. One skilled in the art should recognize that the present disclosure is not limited to the above-mentioned scenario, but may be applied to various other scenarios. For example, heads-up display elements on motor vehicles, commercial presentations on a transparent screen in a mall, and various other applications may all benefit from the techniques disclosed hereinafter.

As described above, the proposed display element may have a layer or layers of liquid crystal materials that are capable to modulate phases of incident lights from light sources when alignments of liquid crystals are changed by an applied voltage signal. In some embodiments, the alignment of the liquid crystal material in each pixel or cell may be individually and precisely controlled by a control voltage such that a precise degree of modulation on the phase of an incident light may be achieved. In some embodiments, the degree of modulation on the phase may be continuous. For example, a value of a modulated phase of an incident light may be a continuous change or adjustment from the original phase of the incident light. For example, if the original phase is zero, the value of the modulated phase may be $0.1\pi$, $0.2\pi$, $0.5\pi$, or any floating-point number times of $\pi$. Such continuous modulated phase values may be obtained by applying predetermined control voltages or signals to control the liquid crystal cells. In some embodiments, the value of modulated phases of an incident light may be in a range of $0-\pi$, $0-2\pi$, $0-4\pi$, $0-6\pi$, etc. In some embodiments, the liquid crystal material of the display element (or each cell of the liquid crystal material) may be configured to have a predetermined thickness to achieve the above-described large ranges of modulated phase values. Alternatively, the liquid crystal material may be controlled by a large control voltage to obtain such large ranges of modulated phase values.

Under a proper control signal, such alignments of liquid crystals in the display element may form a desired holographic interference pattern, and subsequently generate a holographic image when illuminated by a coherent light source. In some embodiments, a computing device may be deployed to generate a proper control signal such that the alignments of the liquid crystals in the display element may form a desired pattern, and subsequently generate a holographic image when illuminated by the light source. Such a computing device may also control the light source to turn on and off synchronously with the change of liquid crystal alignment pattern of the display.

In some embodiments, the proposed display element may further comprise two alignment layers each disposed on one side of the liquid crystal layer. Therefore, the liquid crystal material may be sandwiched between the two alignment layers. According to some embodiments, the proposed display element may further comprise two electrode layers, e.g., a common electrode layer and a pixel electrode layer. The pixel electrode layer may further include transistors, each dedicated for one pixel. Each transistor may provide a controlled voltage for each pixel electrode such that the electric field controlling the liquid crystal layer may be individually and precisely addressed for each cell in the liquid crystal layer. The transistors may be any types of transistors that one skilled in the art should recognize as suitable for performing the functionalities described herein.

In some embodiments, a coherent light source may be used to inject lights into the display element. The coherent light source may be placed on anywhere around the display element as long as the light emitted by the coherent light source eventually enters the display element at the same side of the viewer. For example, the coherent light may be placed at the opposite side of the viewer relative to the display element. A reflecting system may be used to guide the light such that in the end the light is projected to the display element from the same side of the viewer.

In some embodiments, the degree of coherence of a light source may largely affect the quality of the generated holographic image. Laser sources are highly coherent and usually considered as ideal sources for the application, while conventional light sources such as light-emitting diodes are much less coherent and may result in degradation of the image quality. In some embodiments, a coherent light source with lens systems may be used to illuminate the display element. In some embodiments, the coherent light source used to illuminate the display element may include one or more colors. According to some embodiments, the light source may be a two-dimensional scanning projector which may scan a narrow beam of light back and forth through a substrate which may include one or more lens, reflectors, or other optical elements, such that the outbound light may be fed into the holographic display panel or element and cover partial or all of the incident surface of the display panel or element. According to some embodiments, the light source may be a two-dimensional scanning projector which may scan a narrow beam of light back and forth directly onto the holographic display panel or element such that the incident light covers partial or all of the incident surface of the display panel or element.

In some embodiments, a required alignment pattern of the liquid crystals may be different for different light colors even for the same holographic image. This is due to the fact that lights with different colors may have different wave lengths. As a result, when the light source includes multiple colors, at each color mode only a single colored light is emitted, with the display element changed to a corresponding liquid crystal alignment pattern. By sequentially switching through different color modes at a high frequency, a fully colored holographic image may be presented.

In some embodiments, the transmissive display element may further have a partially-transmissive-partially-reflective surface positioned on the opposite side of the liquid crystal layer with respect to the viewer. In some embodiment, the partially-transmissive-partially-reflective surface may reflect the light modulated by the display element back to the viewer's eyes, while allowing the light from an outside world to reach the viewer's eyes. Therefore, a holographic content or image may be displayed on top of the real world. For example, the partially-transmissive-partially-reflective surface may be 50% transmissive and 50% reflective. In other examples, the partially-transmissive-partially-reflective surface may have any combination of transmittance and reflectance to accommodate different requirements under different scenarios. For example, the partially-transmissive-partially-reflective surface may be 30% transmissive and 70% reflective. In some embodiments, the partially-transmissive-partially-reflective surface may be fully reflective such that the light from real world is fully blocked while the modulated light by the display element is fully reflected back to the viewer. As a result, the head-mounted device using the partially-transmissive-partially-reflective surface may, for example, also be used in virtual reality applications. In some embodiments, the head-mounted device may also be a heads-up display system on a motor vehicle where the transparent display element and the partially-transmissive-partially-reflective surface are a portion or entire of a windshield area.

In some embodiments, the display element may include other layers besides one or more liquid crystal layers and the partially-transmissive-partially-reflective layer. In some embodiments, all layers included in the display element other than the partially-transmissive-partially-reflective layer may be configured to be as transmissive as possible. Therefore, light from the real world may pass through the display element.

According to some embodiments, the head-mounted device may also be a presentation system where the transparent display element and the partially-transmissive-partially-reflective surface are a part or entire of a transparent surface. Such a setup may be applied to a commercial showcase to display holographic content on top of exhibits.

According to some embodiments, there may be an additional optical system placed in between the transparent display element and the partially-transmissive-partially-reflective surface or the fully reflective surface, to adjust the projected holographic image. For example the additional optical system may be a single optical lens or a combination of multiple optical lenses.

Figure 1:
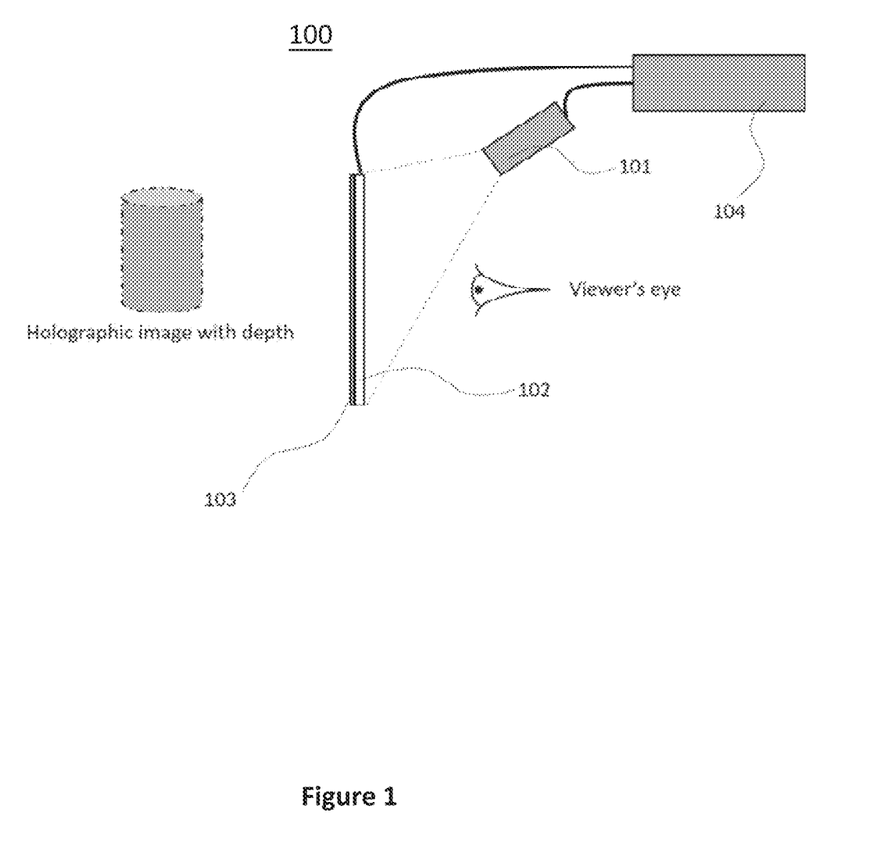
FIG. 1 illustrates a structural diagram of an exemplary system for displaying 3D images according to various embodiments of the present disclosure.

FIG. 1 illustrates a structural diagram of an exemplary system 100 for displaying 3D images according to various embodiments of the present disclosure. The system 100 may include a light source 101, a transparent display element 102 including a partially-transmissive-partially-reflective surface 103, and a computing device 104 operatively connected with the transparent display element 102 and the light source 101. In some embodiments, the light source 101 may include a coherent light source with one or more lens systems. In some embodiments, the light source 101 may include a single color or multiple colors. In some embodiments, the partially-transmissive-partially-reflective surface 103 may be fully reflective. In other embodiments, the partially-transmissive-partially-reflective surface may be 50% reflective and 50% transmissive.

According to some embodiments, the system for displaying 3D images may comprise a guiding element that directs the light from the light source to the display element (e.g., a display panel) and treats the light from the light source so that the incidence angle of the light may be adjusted or controlled to be within a predetermined range. Such a guiding element is beneficial because it can change or enlarge the field of view of the viewer. The guiding element is beneficial also because it can modify the incidence angle of the light striking the display panel from the light source, such that the incidence angle is within the acceptance angle of the display panel, which is described with reference to FIG. 5. When the light from the light source enters the display panel directly, the field of view may be small, causing unsatisfactory experience of viewers. By guiding the light and adjusting the incidence angle of the light, the guiding element may expand the field of view, thus improving the experience of the viewers. For example, the guiding element may be a substrate. In some embodiments, the substrate may house a single reflector or a plurality of reflectors.

Figure 2:
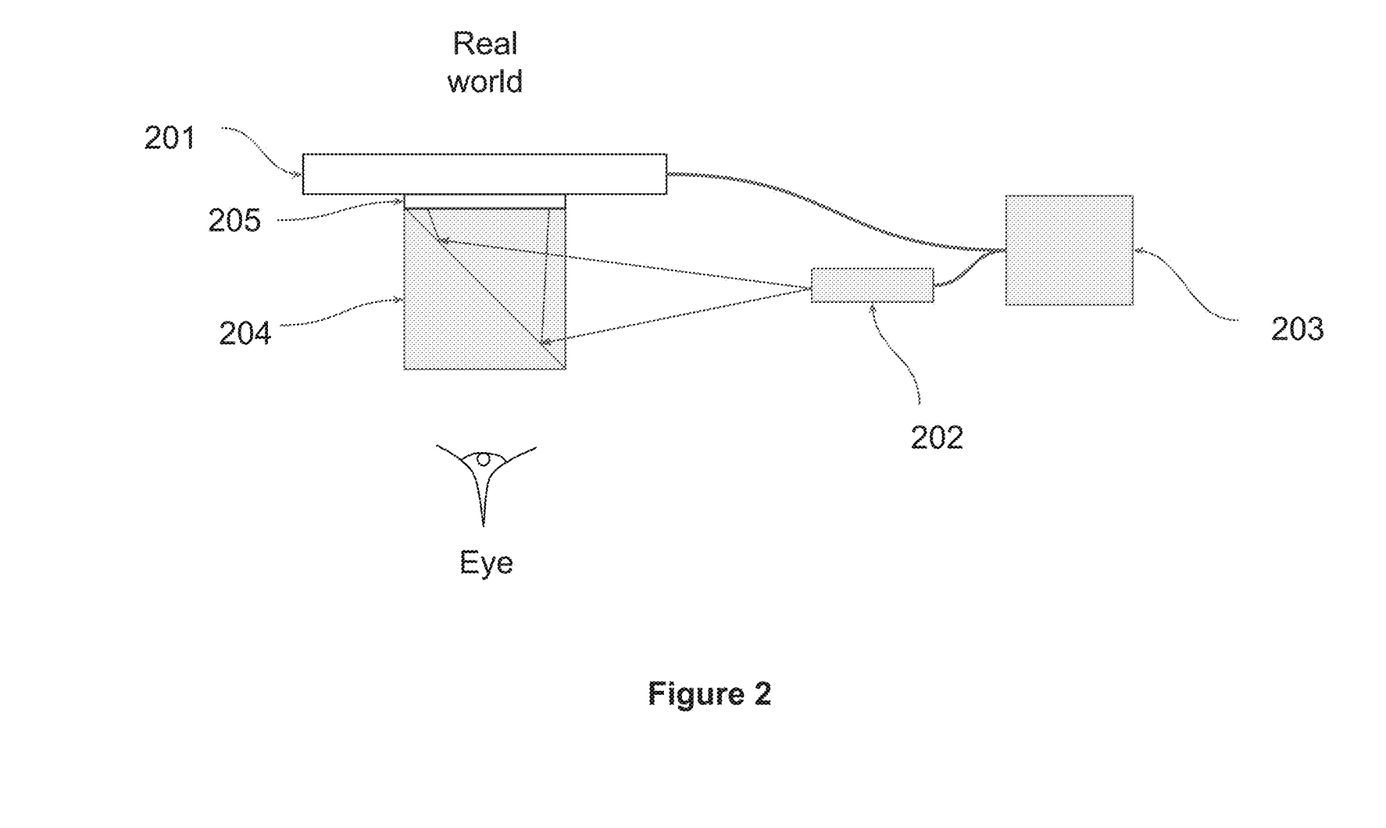
FIG. 2 illustrates a structural diagram of a first exemplary substrate in a system for displaying 3D images according to various embodiments of the present disclosure.

Referring to FIG. 2, a structural diagram of a first exemplary substrate 204 in a system for displaying 3D images is illustrated according to various embodiments of the present disclosure. In the illustrated embodiment of FIG. 2, the substrate 204 may include a linear polarizing beam splitter in the prism form and a retarder 205. A light source 202 may feed a bundle of rays with the orthogonal polarization to the polarizer in the substrate 204 such that the rays are mostly reflected towards a holographic display panel 201. The holographic display panel 201 may modulate the phase of the incoming light and reflect the modulated light back to the substrate 204. The retarder 205 may be placed in between the substrate 204 and the holographic display panel 201. The retarder 205 may modify the polarization of incoming and outgoing lights such that the outgoing lights have the same polarization as the polarizer inside the substrate 204 and therefore the lights may pass through the substrate 204 without a loss of intensity. The light source 202 and the holographic display panel 201 may be both controlled by the computing device 203.

Figure 3:
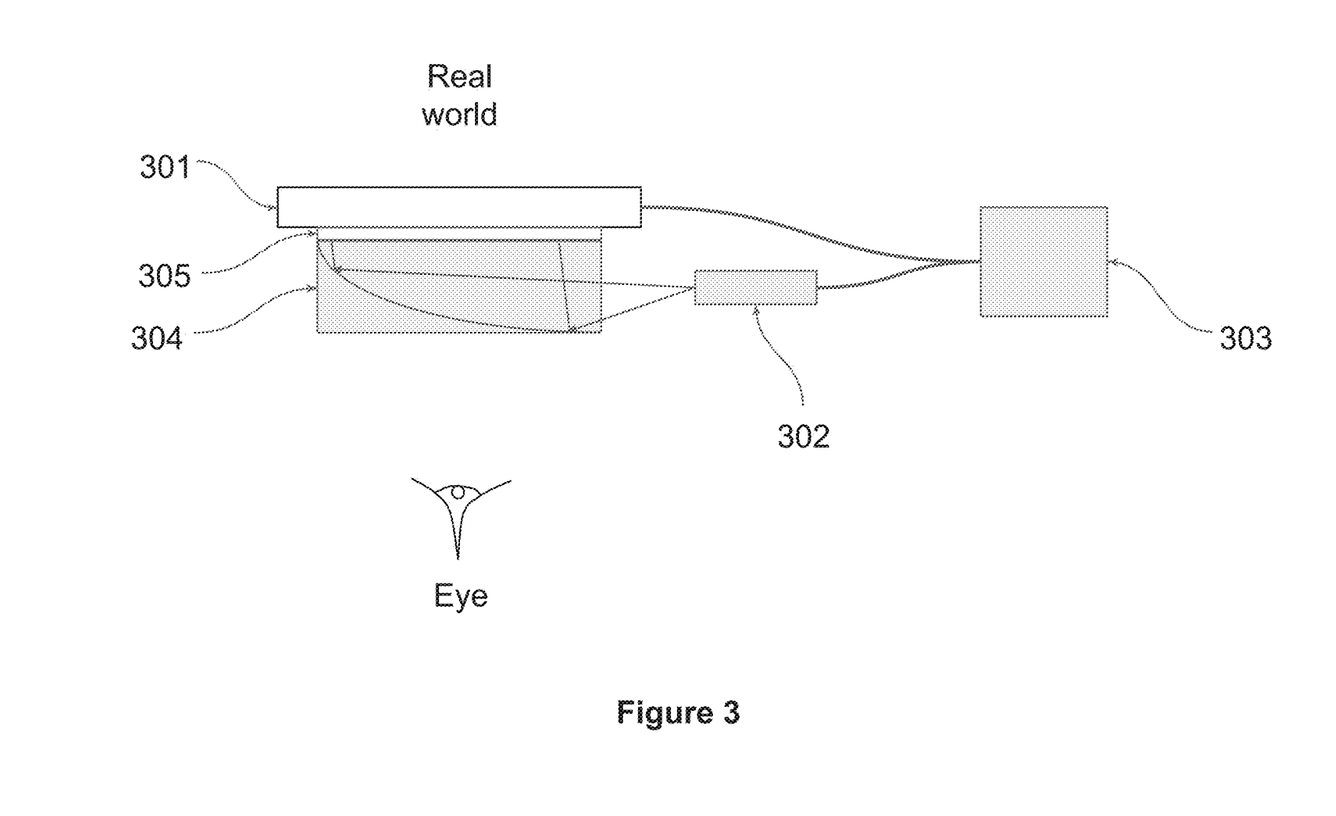
FIG. 3 illustrates a structural diagram of a second exemplary substrate in a system for displaying 3D images according to various embodiments of the present disclosure.

Referring to FIG. 3, a structural diagram of a second exemplary substrate 304 in a system for displaying 3D images is illustrated according to various embodiments of the present disclosure. As illustrated in FIG. 3, the substrate 304 may include a curved reflecting surface. The surface of the substrate 304 may be in a prism form and have a polarized coating on it. The substrate 304 may also include a retarder 305. Similar to the embodiment in FIG. 5, a light source 302 may feed a bundle of rays into the surface 304. In some embodiments, the bundle of rays may have orthogonal polarization with respect to the polarized coating in the substrate 304 such that the bundle of rays is reflected, with most of intensity, towards a holographic display panel 301. The holographic display panel 301 may modulate the phase of the incoming light and reflect the modulated light back to the surface 304. The retarder 305 may be placed between the surface of the substrate 304 and the holographic display panel 301. The retarder 305 may modify the polarization of incoming and outgoing lights such that the outgoing lights may have the same polarization as the polarized coating on the surface of the substrate 304 and therefore may pass through the surface of the substrate 304 without a loss of intensity. The light source 302 and the holographic display panel 301 may be both controlled by the computing device 303.

Figure 4:
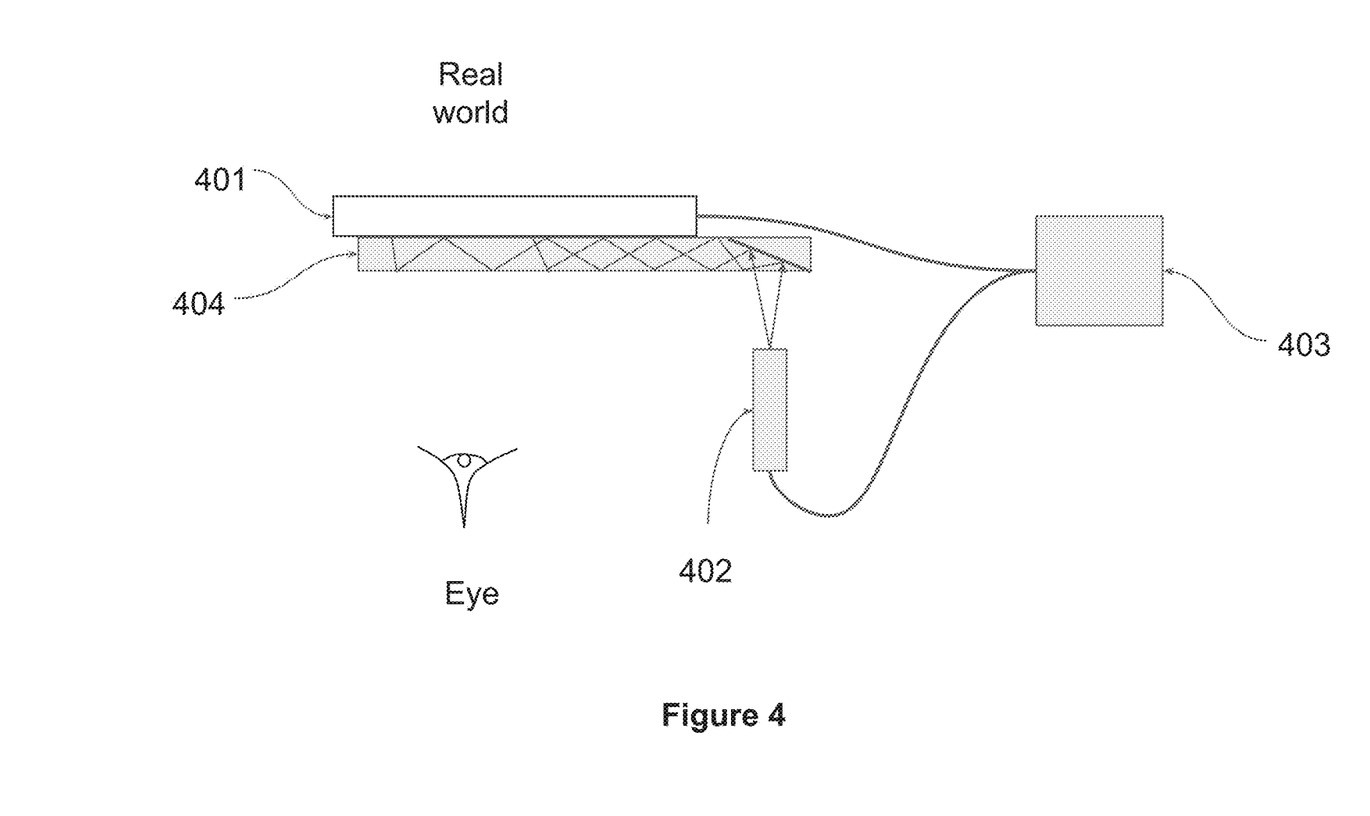
FIG. 4 illustrates a structural diagram of a third exemplary substrate in a system for displaying 3D images according to various embodiments of the present disclosure.

Referring now to FIG. 4, a structural diagram of a third exemplary substrate 404 in a system for displaying 3D images is illustrated according to various embodiments of the present disclosure. In the illustrated embodiment of FIG. 4, the substrate 404 may be a lightguide element. A light source 402 may feed a bundle of rays into the lightguide element 404 such that the bundle of rays reflects inside the lightguide 404, exits from the other side of the lightguide 404 and travels into a holographic display panel 401. The light source 402 and the holographic display panel 401 may be both controlled by the computing device 403.

Figure 5:
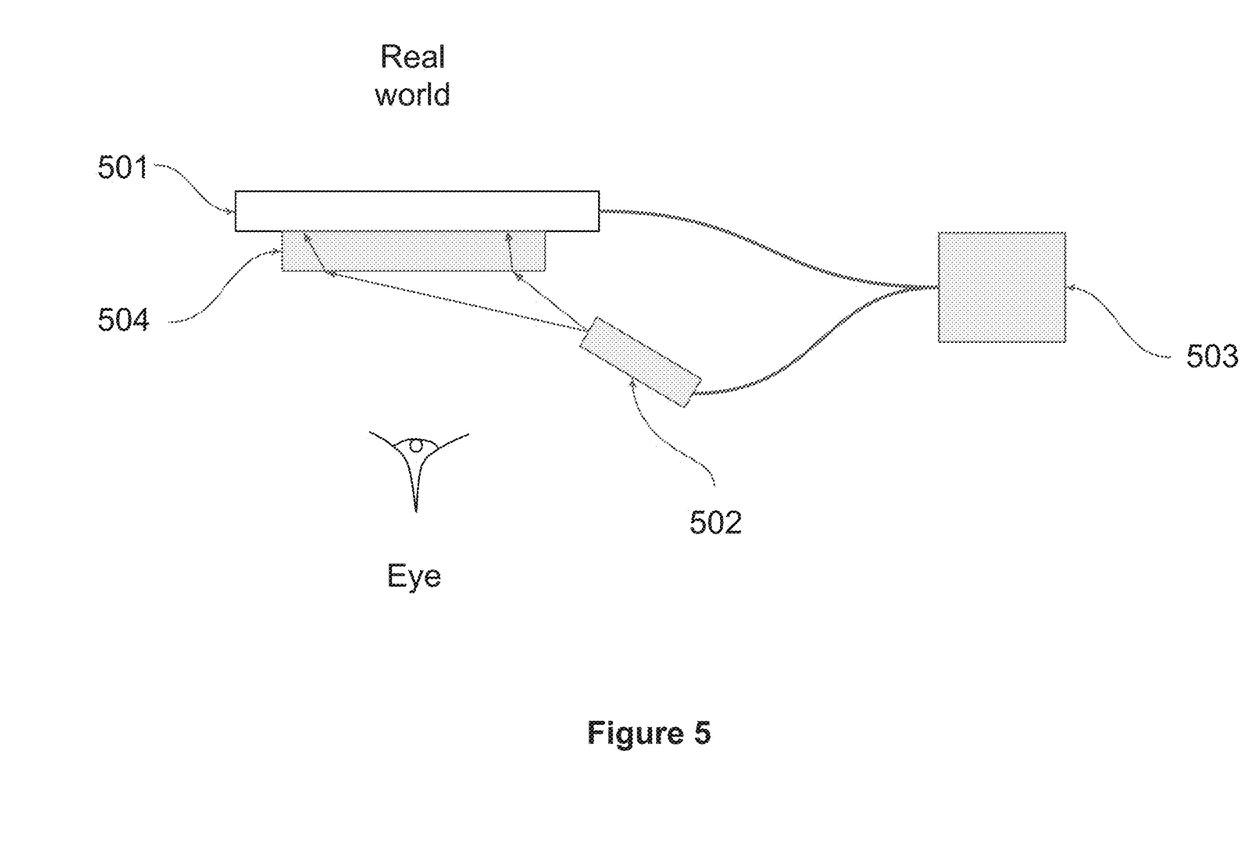
FIG. 5 illustrates a structural diagram of a fourth exemplary substrate in a system for displaying 3D images according to various embodiments of the present disclosure.

Referring to FIG. 5, a structural diagram of a fourth exemplary substrate in a system for displaying 3D images is illustrated according to various embodiments of the present disclosure. According to the illustrated embodiments of FIG. 5, the system for displaying 3D images may comprise a substrate directing the light from the light source to a holographic display panel 501. The substrate may include a diffractive optical element (DOE) 504. The DOE 504 may modify the incidence angle of a light from a light source 502 to a predetermined range of values. Therefore, in some embodiments, the light may be fed into the holographic display panel 501 within an acceptance angle of the display panel 503. In some embodiments, an incidence angle may be defined as the angle between a light ray incident on a surface and the line perpendicular to the surface at the point of incidence. In addition, the acceptance angle of a display panel may be defined as the maximum incidence angle of incoming light rays at which the panel is capable of modulating the incoming light in a controlled and expected manner. In some embodiments, the DOE 504 may only affect the light within a predetermined incidence angle (e.g., within a predetermined range of angle values) relative to the incident surface of the DOE such that only light rays from the direction of the light source will be affected. In some embodiments, such a predetermined range of incidence angle values may be determined based on the position and/or direction of the light source.

In some embodiments, other factors may also determine the acceptance angle. For example, The acceptance angle may be dependent on the construction of the display panel. For example, the depths of liquid crystal cells in the liquid crystal layer may limit the acceptance angle. If a cell is very deep (compared with its width), e.g., the depth of the cell has a larger value than that of its width, light with a large incidence angle may travel into the wall of the cell and scatters into its neighboring cells before it reaches the bottom of the cell, or before it exits the cell after being reflected. As a result, there may be an unexpected "cross-talk" effect that produces unwanted interference. Therefore, the acceptance angle may be limited based on the depths of the cells to avoid the "cross-talk" effect. In addition, the cell depth may depend on the type of liquid crystal. If the liquid crystal is able to achieve desired modulation on phase of the light within a smaller thickness, then the cells' depths may be smaller correspondingly, and therefore the display panel may have a higher acceptance angle. For example, a display panel (e.g., the display panel including a spatial light modulator (SLM) described below with reference to FIG. 6) may have an acceptance angle of 45 degree. In an ideal case, the acceptance angle may approach 90 degree, which means that the light almost parallel to the display panel may also be effectively modulated.

The holographic display panel 501 may modulate the phase of an incoming light and reflect the modulated light back to the substrate. The light source 502 and the holographic display panel 501 may be both controlled by one or more control signals provided by the computing device 503.

Figure 6:
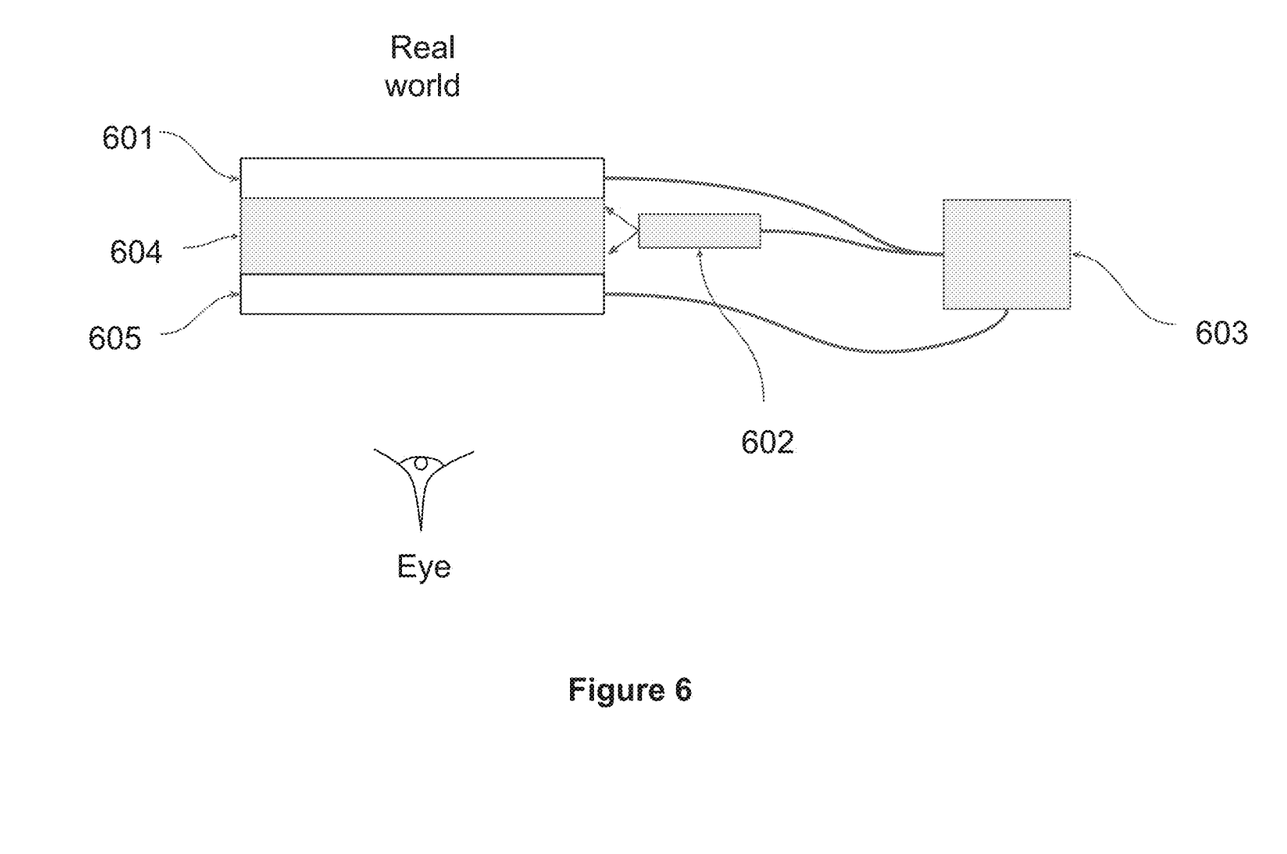
FIG. 6 illustrates a structural diagram of a transmissive spatial light modulator (SLM) in a system for displaying 3D images according to various embodiments of the present disclosure.

Referring to FIG. 6, a structural diagram of a transmissive spatial light modulator (SLM) 605 in a system for displaying 3D images is illustrated according to various embodiments of the present disclosure. In the illustrated embodiments of FIG. 6, the system for displaying 3D images may include an additional transmissive spatial light modulator (SLM) 605 on the light path from a holographic display panel 601 to the eyes of a viewer. The SLM 605 may be placed behind the substrate 604 along the light path from the holographic display panel 601 to the eyes of a viewer. In some embodiments, the substrate 604 may be any one from the embodiments described above with reference to FIGS. 2-5. In some embodiments, the substrate 604 may be any light guiding element that one skilled in the art would recognize as suitable for usage in the present disclosure. In some embodiments, the SLM 605 may be attached on the side of the substrate 604 away from the holographic display panel 601 and closer to the viewer. The SLM 605 may impose additional modulation on the amplitudes of the lights exiting from the holographic display panel 601 such that additional details of the result images may be obtained.

Alternatively, the system for displaying 3D images in FIG. 6 may include a liquid crystal lens 605 on the light path from the holographic display panel 601 to the eyes of the viewer. Similarly, the liquid crystal lens 605 may be positioned behind the substrate 604 along the light path from the holographic display panel 601 to the eyes of the viewer. For example, the liquid crystal lens 605 may be placed on the side of the substrate 604 away from the holographic display panel 601 and closer to the eyes of the viewer. In some embodiments, the liquid crystal lens 605 may be used to product a variety of treatment. For example, the liquid crystal lens 605 may be provided to expand the field of view for the viewer.

Figure 7:
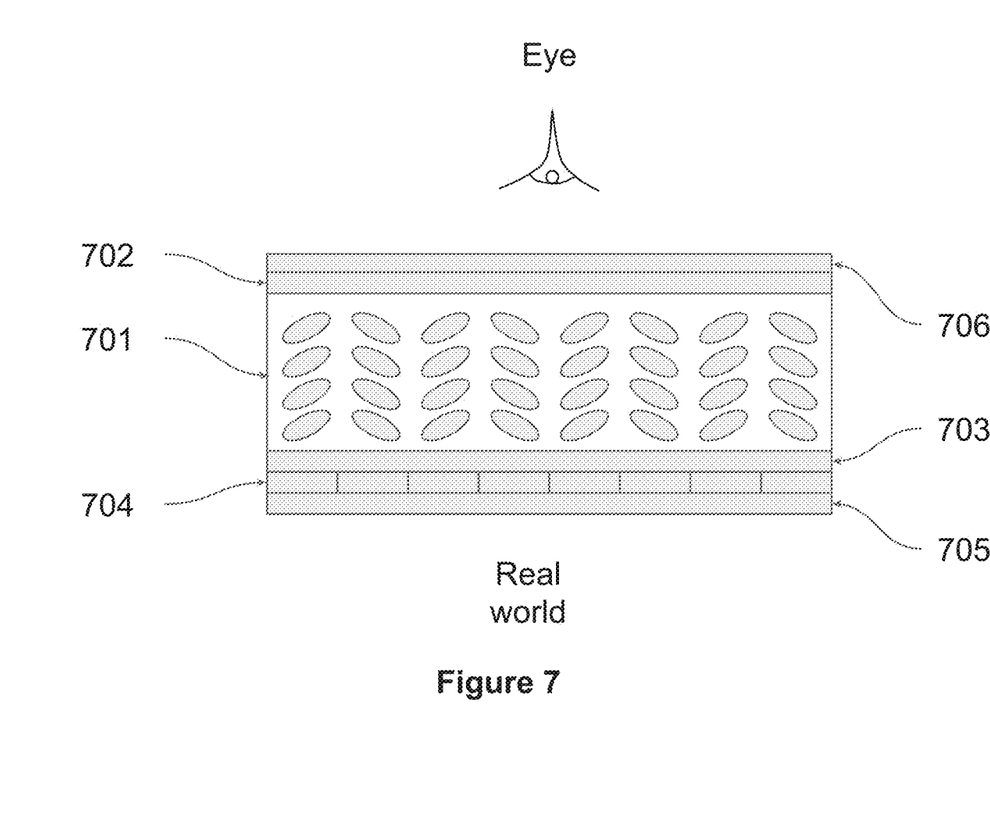
FIG. 7 illustrates a structural diagram of an exemplary holographic display element in a system for displaying 3D images according to various embodiments of the present disclosure.

Referring now to FIG. 7, a structural diagram of an exemplary holographic display element in a system for displaying 3D images is illustrated according to various embodiments of the present disclosure. According to the illustrated embodiments of FIG. 7, the holographic display panel may include a liquid crystal (LC) layer 701, a common electrode layer 702, a partially-transmissive-partially-reflective layer 703, a pixel electrode layer 704 and two substrates 705, 706. The common electrode 702 may be disposed on the side of the LC layer 701 that is closer to the eyes of a viewer. The partially-transmissive-partially-reflective layer 703 may be disposed on the other side of the LC layer 701 (i.e., the side away from the eyes of the viewer). Thus one side of the partially-transmissive-partially-reflective layer 703 may be attached to the LC layer 701. The pixel electrode layer 704 may be disposed on the other side of the partially-transmissive-partially-reflective layer 703. Thus, the partially-transmissive-partially-reflective layer 703 is sandwiched between the LC layer 701 and the pixel electrode layer 704. Further, the substrate 705 may be disposed on the pixel electrode layer 704 (e.g., on the side other than the one attached to the partially-transmissive-partially-reflective layer 703). The substrate 706 may be disposed on the common electrode 702 (e.g., on the side other than the one attached to the LC layer 701.

In some embodiments, both substrates 705 and 706 are glass substrates. In some embodiments, both of the common electrode layer 702 and the pixel electrode layer 704 may be made of transparent material. For example, both of the common electrode layer 702 and the pixel electrode layer 704 are made of indium tin oxide (ITO). These two electrode layers 702 and 704 may generate an electrical field that controls the LC layer 701, wherein the electrical field for each liquid crystal cell may be individually addressed by controlling the voltage for each pixel electrode in the pixel electrode layer 704. The partially-transmissive-partially-reflective layer 703 may be, for example, 50% reflective and 50% transmissive. Other reflective and transmissive arrangements of the partially-transmissive-partially-reflective layer 703 are possible.

According to some embodiments, the pixel electrode layer 704 may further include transistors, each dedicated for one pixel. Each transistor may provide a controlled voltage for each pixel electrode such that the electric field controlling the liquid crystal layer 701 may be individually and precisely addressed for each cell in the liquid crystal layer 701. The transistors may be any types of transistors that one skilled in the art should recognize as suitable for performing the functionalities described herein.

Figure 8:
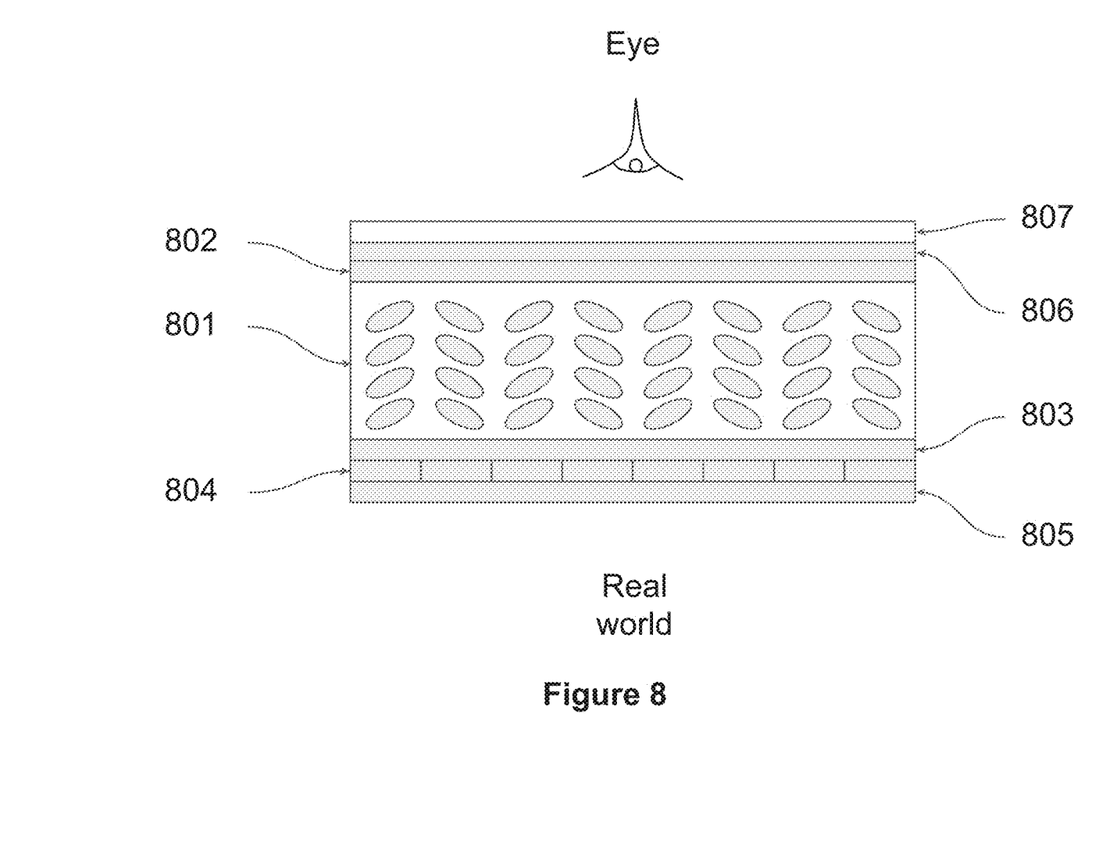
FIG. 8 illustrates a structural diagram of another exemplary holographic display element in a system for displaying 3D images according to various embodiments of the present disclosure.

Referring to FIG. 8, a structural diagram of another exemplary holographic display element in a system for displaying 3D images is illustrated according to various embodiments of the present disclosure. Similar to the embodiments of FIG. 7, the holographic display panel in FIG. 8 may include a liquid crystal (LC) layer 801, a common electrode 802, a partially-transmissive-partially-reflective layer 803, a pixel electrode layer 804 and two substrates 805 and 806. The common electrode 802 may be disposed on the side of the LC layer 801 that is closer to the eyes of a viewer. The partially-transmissive-partially-reflective layer 803 may be disposed on the other side of the LC layer 801 (i.e., the side away from the eyes of the viewer). Thus one side of the partially-transmissive-partially-reflective layer 803 may be attached to the LC layer 801. The pixel electrode layer 804 may be disposed on the other side of the partially-transmissive-partially-reflective layer 803. Further, the substrate 805 may be disposed on the pixel electrode layer 804 (e.g., on the side other than the one attached to the partially-transmissive-partially-reflective layer 803). The substrate 806 may be disposed on the common electrode 802 (e.g., on the side other that the one attached to the LC layer 801.

Also similar to the embodiments of FIG. 7, both of the substrates 805 and 806 are glass substrates. Both of the common electrode layer 802 and the pixel electrode layer 804 may be made of transparent material. For example, the common electrode layer 802 and the pixel electrode layer 804 are both made of indium tin oxide (ITO). These two electrode layers 802 and 804 may generate an electrical field that controls the LC layer 801. The partially-transmissive-partially-reflective layer 803 may be 50% reflective and 50% transmissive. Other reflective and transmissive arrangements of the partially-transmissive-partially-reflective layer 803 are possible. Similar to the embodiments of FIG. 7, the pixel electrode layer 804 may further include transistors, each dedicated for one pixel. Each transistor may provide a controlled voltage for each pixel electrode such that the electric field controlling the liquid crystal layer 801 may be individually and precisely addressed for each cell in the liquid crystal layer 801.

Different from the embodiments of FIG. 7, the holographic display panel in FIG. 8 may further include a retarder layer 807. In some embodiments, the retarder layer 807 may alter the polarization state of the incoming and outgoing lights. The retarder layer 807 may be disposed on the glass substrate 806 (e.g. on the side closer to the eyes of the viewer).

The semi-transmissive-semi reflective layers 703 and 803 in the embodiments of FIGS. 7 and 8 may be a linear polarizer which has an orthogonal polarization with respect to a light modulated by the LC layers 701 and 801, such that the modulated light is fully reflected without a loss of intensity, while an unmodulated or unpolarized light from the real world entering from the other side of the semi-transmissive-semi reflective layers 703 and 803 may pass through with at least some degree of intensity loss.

The liquid crystal layers 701 and 801 shown in FIGS. 7 and 8 may use various types of liquid crystals. For example, the liquid crystal layers may be made of one or more of the following types of liquid crystals: Twisted Nematic (TN), Vertically Aligned Nematic (VAN), Parallel Aligned Nematic (PAN), zero-twisted Electronically Controlled Birefringence (ECB), Optically Controlled Birefringence (OCB), Surface-stabilized Ferroelectric Liquid Crystal (SSFLC). One skilled in the art should recognize that other types of appropriate liquid crystals may also be used as the liquid crystal layers 701 and 801 in the holographic display elements in FIG. 7 and FIG. 8. In some embodiments, the preferable liquid crystal materials used to make the liquid crystal layers 701 and 801 may have a higher birefringence and consequently a faster response speed. In addition, the materials used to make the liquid crystal layers 701 and 801 may have a reasonably high positive dielectric anisotropy such that they may respond to low voltages.

Figure 9:
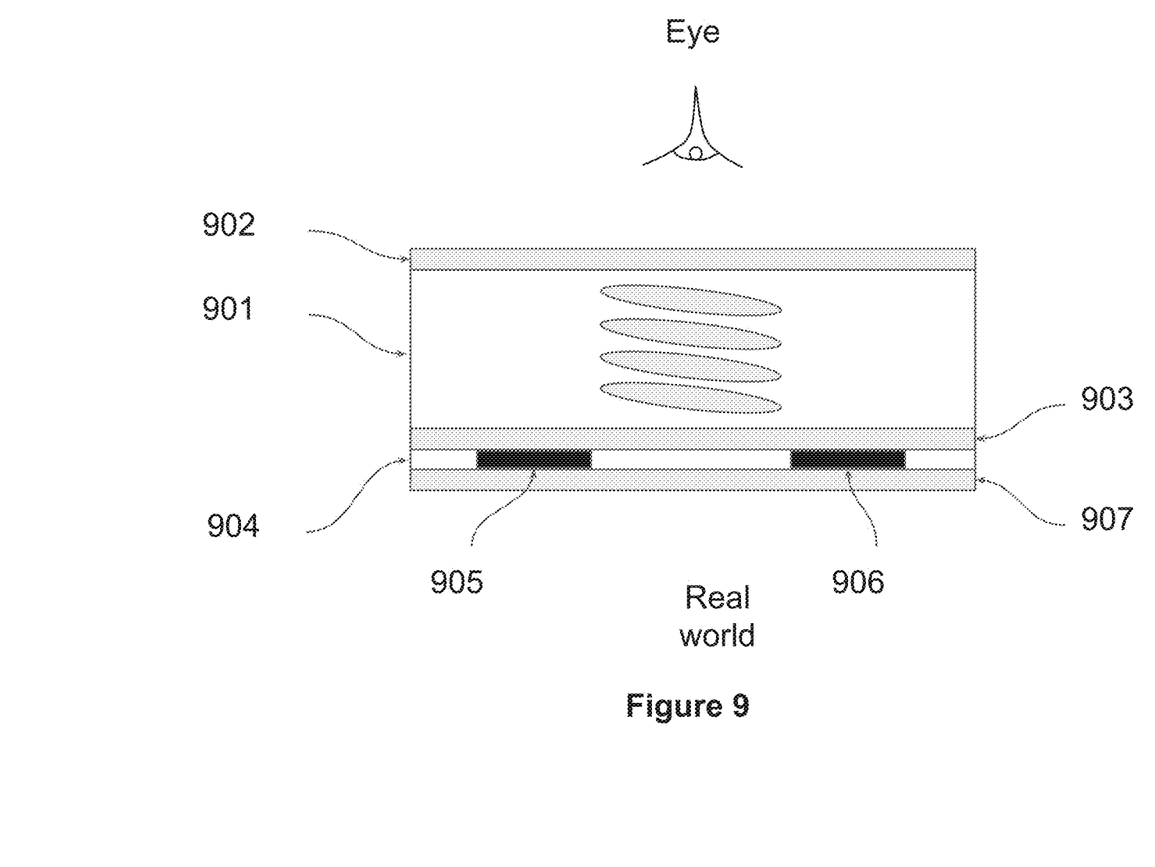
FIG. 9 illustrates a structural diagram of a cell section of an exemplary holographic display element is a system for displaying 3D images according to various embodiments of the present disclosure.

Referring to FIG. 9, a structural diagram of a cell section of an exemplary holographic display element in a system for displaying 3D images is illustrated according to various embodiments of the present disclosure. According to the illustrated embodiments of FIG. 9, the holographic display panel may include a liquid crystal (LC) layer 901, a partially-transmissive-partially-reflective layer 903, an electrode layer 904, and substrates 902 and 907. The partially-transmissive-partially-reflective layer 903 may be disposed on the side of the LC layer 901 that is away from the eyes of the viewer. Thus, one side of the partially-transmissive-partially-reflective layer 903 may be attached to the LC layer 901. The electrode layer 904 may be disposed on the other side of the partially-transmissive-partially-reflective layer 903. Thus, the partially-transmissive-partially-reflective layer 903 is sandwiched between the LC layer 901 and electrode layer 904. For each liquid crystal cell in the LC layer 901, the electrode layer 904 may further comprise a first electrode 905 and a second electrode 906 that generate an electric field across the liquid crystal cell. Further, the substrate 907 may be disposed on the electrode layer 904 (e.g., on the side other than the one attached to the partially-transmissive-partially-reflective layer 903). The substrate 902 may be disposed on the LC layer 901 (e.g., on the side other than the one attached to the partially-transmissive-partially-reflective layer 903). In some embodiments, the electrode layer 904 may further include transistors, each dedicated for one pixel. The transistor may provide a controlled voltage across the first electrode 905 and the second electrode 906 such that the electric field controlling the liquid crystal 901 may be individually and precisely addressed for each cell.

Relational and positional terms such as upper, lower, first, second herein are merely used for distinguishing an entity or operation from another entity or operation, and do not necessarily require or imply that these entities or operations have any of such real relationships or orders. For example, the term upper and lower merely refer to the positional relationship in the figures, but not necessary mean actual positional relationship in real products. Besides, the terms "include", "contain" or any other variations are intended to cover non-exclusive inclusions, so as to cause a process, method, commodity or device including a series of elements to not only include those elements, but also include other elements that are not listed specifically, or also include elements that are inherent in this process, method, commodity or device.

Persons skilled in the art can implement or use the present application according to the description of the disclosed embodiments. It is apparent to persons skilled in the art that various modifications can be made to these embodiments, and general principles defined in this specification may be implemented in other embodiments without departing from the spirit or scope of the present application. Therefore, the present application is not limited by the embodiments described herein, but has the broadest scope conforming to the principles and innovative features disclosed by this specification.

What is claimed is:

1. A display system for presenting a holographic image to a viewer, comprising:
a coherent light source, a display element, and a computing device operatively coupled to the coherent light source and the display element, wherein the coherent light source is configured to emit light that enters the display element from a side corresponding to the viewer, and wherein the display element comprises a liquid crystal layer a partially-transmissive-partially-reflective layer, and a retarder layer that is separate from the liquid crystal layer and is configured to modify a polarization of an incoming and outgoing light to make the outgoing light pass through a guiding element without a polarization mismatch with the guiding element,
wherein the computing device is configured to provide a control signal that causes the display element to display the holographic image, wherein the liquid crystal layer is configured to receive the light emitted from the coherent light source and be controlled by the control signal to modulate a phase of the light to generate the holographic image, and wherein the partially-transmissive-partially-reflective layer reflects the light received from the liquid crystal layer back through the liquid crystal layer to the viewer.

2. The display system according to claim 1, wherein the partially-transmissive-partially-reflective layer is fully reflective, blocking a light from a real world to pass through.

3. The display system according to claim 1, wherein the liquid crystal layer is made of one of the followings types of liquid crystals: Twisted Nematic (TN), Vertically Aligned Nematic (VAN), Parallel Aligned Nematic (PAN), zero-twisted Electronically Controlled Birefringence (ECB), Optically Controlled Birefringence (OCB), Surface-stabilized Ferroelectric Liquid Crystal (SSFLC).

4. The display system according to claim 1, wherein the display element further comprises a first electrode layer disposed on a surface of the liquid crystal layer, and a second electrode layer disposed on a surface of the partially-transmissive-partially-reflective layer, and wherein the partially-transmissive-partially-reflective layer is placed between the liquid crystal layer and the second electrode layer.

5. The display system according to claim 4, wherein the first and second electrode layers include a common electrode layer and a pixel electrode layer, wherein the first electrode layer and the second electrode layer are transmissive.

6. The display system according to claim 5, wherein the common electrode layer comprises Indium Tin Oxide (ITO).

7. The display system according to claim 5, wherein the pixel electrode layer comprises ITO.

8. The display system according to claim 1, wherein the phase of the light is modulated by the liquid crystal to change by a continuous value.

9. The display system according to claim 1, wherein the guiding element is configured to direct a light from the coherent light source to the display element and adjusting an incidence angle of the light from the coherent light source.

10. The display system according to claim 9, wherein the guiding element is a substrate placed between the coherent light source and the display element.

11. The display system according to claim 10, wherein the substrate comprises a beam splitter.

12. The display system according to claim 11, wherein the beam splitter is a linear polarizing beam splitter.

13. The display system according to claim 10, wherein the substrate comprises a curved reflecting surface in a prism form, and wherein the curved reflecting surface comprise a polarized coating.

14. The display system according to claim 10, wherein the substrate comprises a retarder, and wherein the retarder is configured to modify polarization of an incoming and outcoming light.

15. The display system according to claim 10, wherein the substrate is a lightguide element configured to reflect the light from the coherent light source to enter the display element.

16. The display system according to claim 10, wherein the substrate comprises a diffractive optical element (DOE) configured to modify an incidence angle of the light from the coherent light source to a predetermined range of values.

17. The display system according to claim 1, further comprises a transmissive spatial light modulator (SLM) configured to modulate an amplitude of the light reflected back through the liquid crystal layer to the viewer.

18. The display system according to claim 1, wherein the display element further comprises an electrode layer disposed on a surface of the partially-transmissive-partially-reflective layer, and wherein the partially-transmissive-partially-reflective layer is placed between the liquid crystal layer and the electrode layer, and wherein the electrode layer generates an electric field across cells of the liquid crystal layer.

19. A display element for presenting a holographic image to a viewer, comprising:
a liquid crystal layer, a retarder layer, and a partially-transmissive-partially-reflective layer,
wherein the liquid crystal layer receives light from a coherent light source, and wherein the light is from the same side of the viewer relative to the display element, and wherein the liquid crystal layer is controlled by a control signal to modulate a phase of the light from the coherent light source, wherein the retarder layer is separate from the liquid crystal layer and is configured to modify a polarization of an incoming and outgoing light to make the outgoing light pass through a guiding element without a polarization mismatch with the guiding element, and wherein the partially-transmissive-partially-reflective layer receives light from the liquid crystal layer and reflects the light back through the liquid crystal layer to the viewer.

* * * * *